United States Patent [19]

Afimiwala

[11] Patent Number: 4,683,810

[45] Date of Patent: Aug. 4, 1987

[54] TWO-STAGE COMPOSITE PISTON

[75] Inventor: Khurshid A. Afimiwala, Orchard Park, N.Y.

[73] Assignee: Dresser Industries, Inc., Dallas, Tex.

[21] Appl. No.: 681,350

[22] Filed: Dec. 13, 1984

[51] Int. Cl.[4] .................................................. F16J 1/04
[52] U.S. Cl. ....................................... 92/212; 92/214; 92/222; 92/248; 403/267; 403/365
[58] Field of Search ................... 91/508; 92/216, 208, 92/212, 219, 222, 225, 228, 248, 255, 257, 258; 123/193 P; 417/268, 254, 266, 267; 403/267, 266, 265, 365

[56] References Cited

U.S. PATENT DOCUMENTS

| | | | |
|---|---|---|---|
| 1,709,316 | 4/1929 | Lord | 92/187 X |
| 1,815,799 | 7/1931 | Raymond | 92/208 X |
| 4,253,430 | 3/1981 | Garter et al. | 123/193 P X |
| 4,450,610 | 5/1984 | Schaper | 92/212 X |
| 4,466,399 | 8/1984 | Hinz et al. | 92/212 X |

FOREIGN PATENT DOCUMENTS

| | | | |
|---|---|---|---|
| 122423 | 12/1927 | Fed. Rep. of Germany | 417/268 |
| 510852 | 12/1920 | France | 403/365 |
| 113709 | 4/1945 | Sweden | 92/208 |
| 150049 | 5/1955 | Sweden | 403/365 |

Primary Examiner—Edward K. Look
Attorney, Agent, or Firm—William R. Peoples

[57] ABSTRACT

A metal and plastic two-stage composite piston including an annular metal cup, a hollow plastic annular core bonded about the periphery of the cup, a plastic high pressure piston bonded to the interior of the cup, and a plastic low pressure piston bonded about the periphery of the core at the base of the high pressure piston in a fashion such that substantially all of the pressure loads on the pistons are carried directly by the cup and the core of the composite piston.

12 Claims, 9 Drawing Figures

TWO-STAGE COMPOSITE PISTON

BACKGROUND OF THE INVENTION

1. Field of the Invention

This invention relates to pistons and in particular to a relatively lightweight two-stage piston for multiple stage reciprocating compressors and related equipment.

2. Description of the Prior Art

As is well known in the art, in a typical reciprocating compressor the mechanical losses and deleterious vibrations associated with the reciprocating mass of the pistons can be significantly reduced by reducing the mass of the pistons. However, due to the material strength and fatigue properties generally required to such pistons, the pistons heretofore in use have usually been fabricated from relatively heavy castings and the like. This has been particularly the case with two-stage pistons where pressure loads on two separate piston faces must be carried through a common connection to the connecting rod driving the piston.

In recent years, lightweight composite structures have been employed in a variety of applications where high strength and lightweight constructions are particularly desirable. For example U.S. Pat. Nos. 4,306,489 and 4,450,610 both show pistons for internal combustion engines formed of metal and plastic composites. As can be seen in those patents, both of those designs call for bonding a metal or ceramic cap or cover onto a plastic core to form their respective pistons. However, neither of those patents address the load distribution problems encountered in two-stage pistons where the pressure loads from two separate piston faces must be transfered through the piston to a common connection with the connecting rod.

As indicated in the foregoing, in the past it has generally been necessary to fabricated two-stage pistons from relatively heavy metal castings due to the load distribution problems typical of that type of piston. Thus, while a variety of composite designs have been used for single-stage pistons such as those shown in the patents noted above, weight and vibration has continued to be an on-going problem in the design and fabrication of compressors incorporating two-stage pistons.

SUMMARY OF THE INVENTION

The present invention relates to pistons and in particular to a relatively lightweight composite two-stage piston for multiple stage reciprocating compressors and related equipment.

The two-stage composite piston embodying the invention includes a high pressure first piston and a low pressure second piston which are adapted to be reciprocably mounted in the axially aligned high and low pressure chambers of a multiple stage compressor. The base of the high pressure piston is bonded within a cup provided in the structure of the composite piston which is bonded within a hollow annular core sized to receive a connecting rod within its interior which is in turn adapted to be operatively coupled to the end of the connecting rod. The low pressure piston is secured about the annular core, and is similarly carried by the core. Thus, essentially all of the pressure loads on the high and low pressue pistons are carried directly by the cup and core of the composite piston. Experience has demonstrated that this has significantly reduced the mass of material heretofore required to assure the structural integrity of the piston while at the same time accomodating the use of relatively lightweight plastic, preferably steel and a carbon fiber wound epoxy resin plastic. This composite has been found to be particularly appropriate for pistons used in high pressure multiple stage compressors where the operating temperatures can be as high as 450° F. However, at lower temperatures, various other plastics and metals can be utilized as will be readily apparent to one skilled in the art.

From the foregoing, it can be seen that the invention contemplates a relatively straightforward and lightweight two-stage piston arrangement which is particularly suited for use in high pressure multiple stage compressors. However, it is to be understood that various changes can be made in the arrangement, form and construction of the apparatus disclosed herein without departing from the scope and spirit of the invention.

DESCRIPTION OF THE PREFERRED EMBODIMENT

Figure 1:
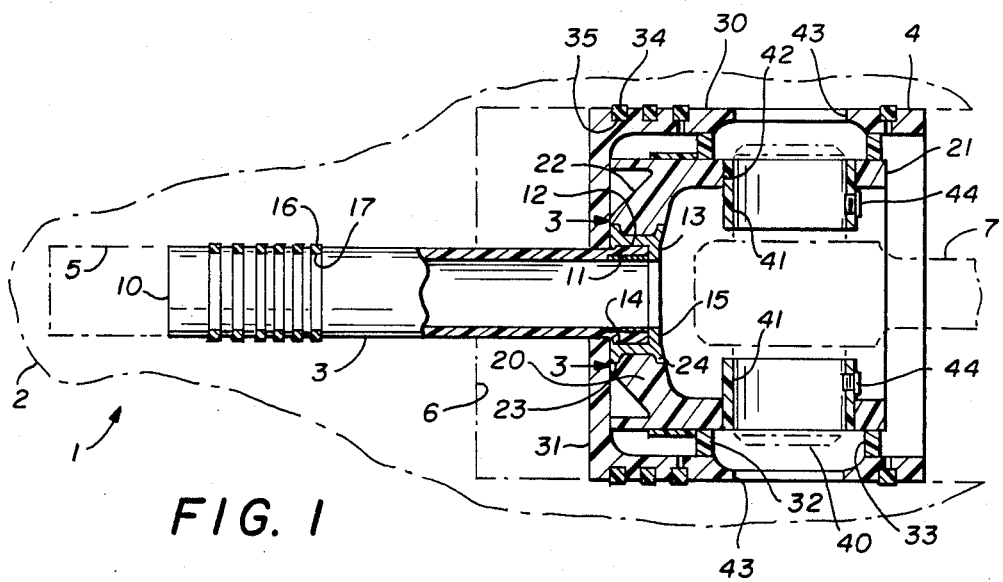
FIG. 1 is a partial cross-sectional view of a two-stage composite piston embodying the invention mounted within the cylinder chambers of a multiple stage compressor shown schmetically in phantom lines.

Referring now to FIG. 1, the composite two-stage piston 1 embodying the invention is particularly adapted for use in a high pressure multiple stage compressor 2 as shown schematically in the drawing. The composite piston 1, which includes a high pressure first piston 3 and a low pressure second piston 4, is reciprocably mounted in the high and low pressure cylinder chambers 5 and 6, respectively. As in the typical compressor of this type, the composite piston 1 is reciprocable driven within the cylinder chambers 5 and 6 by a connecting rod 7 in the conventional fashion.

Figure 3:
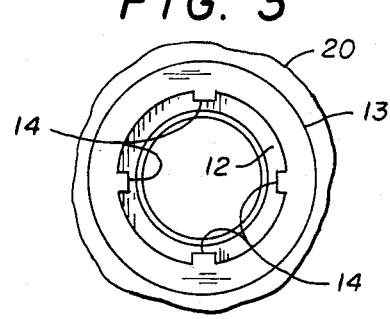
FIG. 3 is a partial cross-sectional view taken generally along line 3—3 in FIG. 1.

The composite two-stage piston 1 is preferably constructed of steel and a carbon fiber reinforced epoxy resin plastic. In the embodiment shown, the high pressure piston 3 is formed of a hollow epoxy resin plastic tube having a closed outer end forming a piston head 10 and a base or attachment portion 11. As shown in FIG. 3, the base 11 is provided with an annular shoulder 12 which is secured within a steel cup 13 by inwardly radiating annular tabs 14 and 15 provided about the inner periphery of the cup 13, and bonded to the interior of the cup 13 by a suitable epoxy adhesive as will be described. Additionally, to provide a seal between the high pressure piston 3 and the walls of the cylinder chamber 5, a plurality of conventional piston sealing rings 16 are secured in a corresponding plurality of circumferential grooves 17 disposed about the periphery of the piston in the usual fashion.

The low pressure piston 6 is supported within the composite two-stage piston 1 by a hollow annular epoxy resin plastic core 20 having a conically-shaped head portion 22 bonded to the outer periphery of the cup 13 and an outer cylindrical shell 21 sized to receive the connecting rod 7 within its interior. To further reinforce the bond between the cup 13 and the core 20, a pair of axially spaced annular rims 23 and 24 are provided about the outer periphery of the cup which embrace the marginal edges of the head portion 22 about the periphery of the cup.

The low pressure piston 4 is similarly formed of an epoxy resin plastic and includes an outer cylindrical sleeve or ring carrier 30 and a piston head 31 at the inner end of the cylindrical sleeve 30. As shown in the drawings, the cylindrical sleeve 30 is concentrically spaced from the periphery of the shell 21 by a pair of spacer rings 32 and 33 with the piston head 31 abutting the annular rim 23, the conically-shaped head portion 22, and the inner end of the shell 21. As in the case of the bond between the high pressure piston 3 and the cup 13, the mating surfaces of these components are bonded together with an appropriate epoxy adhesive. Similarly, a plurality of conventional piston rings 34 are secured in a corresponding plurality of circumferential grooves 35 disposed about the periphery of the cylindrical sleeve or ring carrier 30.

As shown in FIG. 1, the invention provides for operatively coupling the composite piston 1 to the connecting rod 7 with a conventional steel wrist pin 40. The wrist pin 40 is removably secured within a pair of annular plastic collars 41 which are bonded to the shell 21 within a pair of transversely aligned apertures 42, it being noted that a corresponding pair of apertures 43 are provided in the cylindrical sleeve 30. This enables a workman to simply slip the pin 40 through one of the apertures 43 to secure the pin through the collars 41 and the connecting rod 7 to couple the composite piston to the rod. In this regard, it should also be noted that a small screw 44 is threaded through each of the collars 41 which can be ajusted to clamp the pin 40 in position after it is secured through the collars 41 to prevent it from rotating during operation of the compressor. This has been found to reduce wear on the collars 41 while at the same time insuring sufficient relative motion between the pin 40 and the connecting rod 7 for proper lubrication of those components.

Figure 2:
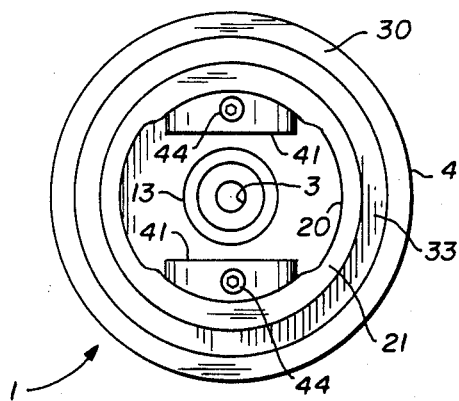
FIG. 2 is an end elevation view of the two-stage piston shown in FIG. 1.
Figure 4:
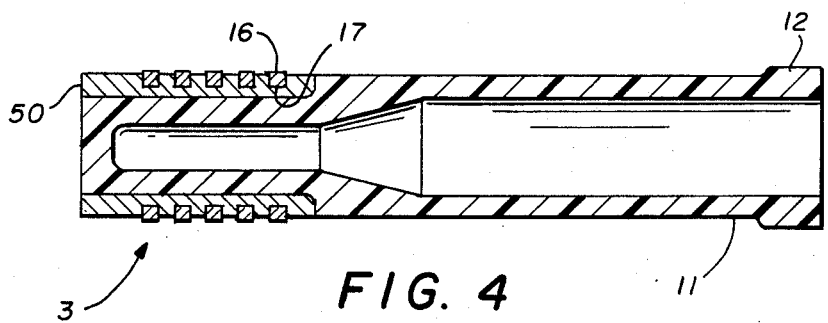
FIG. 4 is a fragmentary cross-sectional view showning an alternative embodiment.

FIG. 4 shows an alternative embodiment of the high pressure piston 3. As shown in the drawing, wherein the same numerals indicate the same elements as in FIGS. 1-3, in this embodiment an annular aluminum sleeve 50 is bonded about the end of the piston 3. This arrangement provides a reinforced retaining structure for the piston rings 16 carried within the circumferential grooves 17 cut in the periphery of the aluminum sleeve 50.

As noted in the foregoing, the two-stage piston 1 is constructed of a metal and plastic composite which experience has demonstrated is particularly adapted to the high temperatures typically encountered in high pressure multiple stage compressors and the like, while at the same time being of a relatively lightweight and easily fabricated construction. In prototypes of the embodiments shown, the cup 13 was made of steel, and the pistons 3 and 4, core 20, spacer rings 32 and 33, and collars 41 were all made from a carbon fiber wound epoxy resin plastic such as Hercules 4502 sold by the Hercules Corporation of Salt Lake City, Utah. These components were in turn bonded together with a two-stage epoxy adhesive such as Hysol EA9307 marketed by the Dexter Corporatin of Olean, New York using conventional curing practices.

FIGS. 5-9 generally illustrate one method of assembling the composite two-stage piston 1. While the embodiment shown incorporates the annular aluminum sleeve 50 shown in FIG. 4, it is to be understood that essentially the same method can be used in the fabrication of the embodiment shown in FIGS. 1-3.

Figure 5:
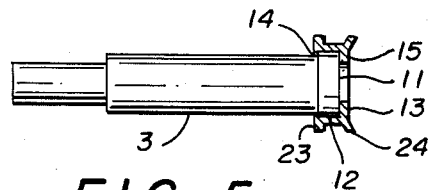
FIG. 5-9 generally illustrate the method of fabricating the two-stage composite piston.
Figure 6:
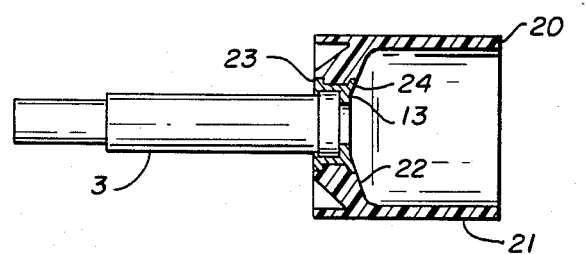
Figure 7:
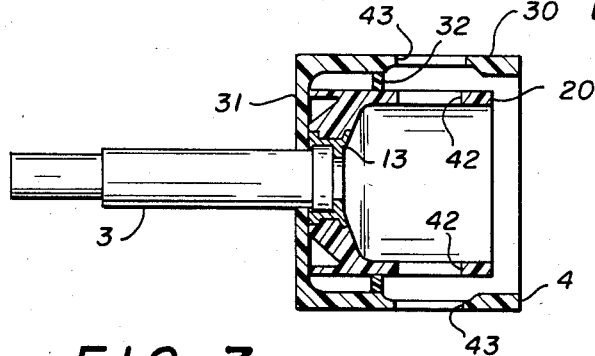
Figure 8:
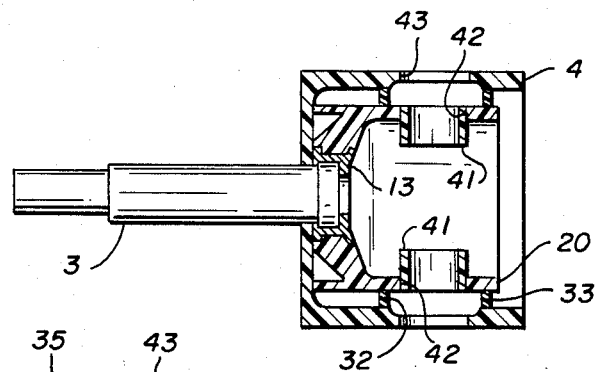
Figure 9:
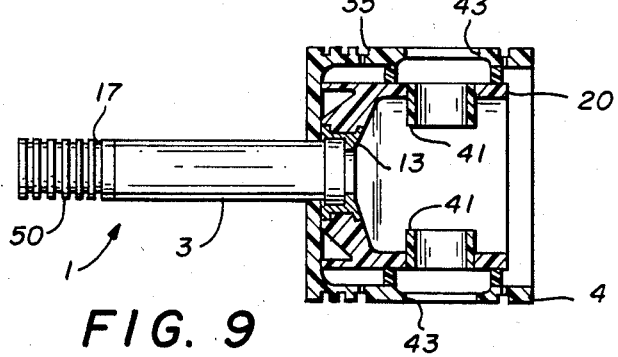

Referring to FIG. 5, the base 11 of the high pressure piston 3 is coated with adhesive and inserted into the steel cup 13. After securing the base 11 in the cup 13, the tabs 14 are folded or bent inwardly against the base 11 to entrap the shoulder 12 within cup. Next, as illustrated in FIG. 6, the core 20 is built-up and bonded on the cup 13 using conventional plastic molding and machining techniques. Then, as shown in FIGS. 7 and 8, the low pressure piston 4, spacer rings 32 and 33, and sleeves 41 are bonded within the assembly. Finally, the aluminum sleeve 50 is bonded about the end of the high pressure piston 3 and the final machining of the composite piston is completed as indicated in FIG. 9.

From the foregoing, it can be seen that the invention contemplates a relatively lightweight yet easily fabricated composite two-stage piston. In the embodiments shown, the pressure loads on both the high and low pressure pistons are carried directly by the cup 13 and core 20 in a fashion essentially minimizing the mass of material required to support these loads over the life of the two-stage piston. This structure, coupled with the composite construction of the piston, has resulted in a two-stage piston weighing less than 50 percent of the weight of the cast metal two-stage pistons heretofore in use. This has significantly reduced vibration induced by the piston during operation of the compressor as well as the weight and bulk of the stationary structure of the compressor necessary to withstand such loads.

I claim:

1. A composite two-stage piston, comprising:
   an annular cup;
   a hollow annular core bonded to the periphery of said annular cup having an outer shell sized to receive a connecting rod within its interior;
   coupling means in said annular shell adapted to operatively couple the piston rod to the shell;
   an elongated first piston having a base at one of its ends and a first piston head formed at its other end, said base being entrained within and bonded to said cup;
   a second piston having an annular sleeve concentrically spaced from the periphery of said shell and a second piston head formed at one end of said sleeve about the base of said first piston bonded to said cup and said annular core; and
   at least one spacer ring interposed and bonded between said shell and sleeve.

2. The two-stage piston of claim 1, and
   said cup being formed of metal and said core, pistons and spacer ring being formed of a relatively lightweight plastic material.

3. The two-stage piston of claim 1, and
   said cup being formed of steel and said core and pistons being formed of a carbon fiber would epoxy resin plastic.

4. The two-stage piston of claim 1, and
   said shell having a pair of transversely aligned apertures and an annular collar bonded within each of said apertures sized to receive a transverse pin to form said coupling means adapted to secure the connecting rod to the shell.

5. The two-stage piston of claim 4, and clamping means in at least one of said annular collars adapted to secure the transverse pin against rotation within said collar.

6. The two-stage piston of claim 4, and
at least one of said spacer rings being interposed and bonded between said shell and sleeve axially adjacent each side of said apertures.

7. The two-stage piston of claim 1, and
said core having a head portion embracing the periphery of said cup, and
said cup having a pair of axially spaced outwardly radiating annular rims embracing the marginal peripheral edges of said head portion.

8. The two-stage piston of claim 1, and
said core including a generally conically-shaped head portion radiating inwardly from said shell to said cup, and said shell having an outer end portion abutting said second piston head.

9. The two-stage piston of claim 1, and said base having an annular shoulder about its periphery, and said cup having a pair of axially spaced inwardly radiating tabs retaining said shoulder within the cup.

10. The two-stage piston of claim 1, and
each of said piston having at least one circumferential groove about its periphery sized to receive a piston ring therewithin.

11. The two-stage piston of claim 1, and
said first piston having a metal sleeve secured about its other end proximate the first piston head, and said metal sleeve and said annular sleeve each having at least one circumferential groove about its periphery sized to receive a piston ring therewithin.

12. A composite two-stage piston for a compressor, comprising:
an annular metal cup having a pair of axially spaced outwardly radiating annular rims disposed about its periphery and a pair of axially spaced inwardly radiating tabs;
a hollow annular core having an outer shell sized to receive a connecting rod within its interior and a conically-shaped head portion bonded to said cup radiating inwardly from said shell in a fashion embracing the periphery of the cup between said annular rims;
said shell having a pair of transversely aligned apertures and an annular collar bonded within each of said apertures sized to receive a transverse pin adapted to secure the connecting rod to the shell;
a hollow elongated first piston having a base at one of its ends bonded to the cup and a first piston head at its other end, said base including an annular shoulder retained within the cup by said tabs;
a second piston having an annular sleeve concentrically spaced from the periphery of said shell and a second piston head formed at one end of said annular sleeve about the base of said first piston bonded to said cup and the shell;
a spacer ring interposed and bonded between said shell and sleeve axially adjacent each of said apertures; and
said core, pistons and spacer rings being formed of a relatively lightweight plastic material.

* * * * *